United States Patent
Ferguson et al.

(10) Patent No.: US 11,216,047 B2
(45) Date of Patent: Jan. 4, 2022

(54) SYSTEM AND METHOD FOR DETECTING RELATIONSHIP BETWEEN INTELLIGENT POWER STRIP AND DEVICE CONNECTED THERETO

(71) Applicant: VERTIV IT SYSTEMS, INC., Huntsville, AL (US)

(72) Inventors: Kevin R. Ferguson, Dublin, OH (US); Steven Geffin, Bay Harbor Islands, FL (US)

(73) Assignee: Vertiv IT Systems, Inc., Huntsville, AL (US)

( * ) Notice: Subject to any disclaimer, the term of this patent is extended or adjusted under 35 U.S.C. 154(b) by 41 days.

(21) Appl. No.: 16/552,673

(22) Filed: Aug. 27, 2019

(65) Prior Publication Data

US 2020/0117249 A1    Apr. 16, 2020

Related U.S. Application Data

(60) Provisional application No. 62/744,477, filed on Oct. 11, 2018.

(51) Int. Cl.
  *G06F 1/18*    (2006.01)
  *G06F 1/3206*    (2019.01)
  (Continued)

(52) U.S. Cl.
  CPC ............ *G06F 1/189* (2013.01); *G06F 1/3206* (2013.01); *G06F 11/1004* (2013.01); *H01B 9/003* (2013.01); *H04B 3/542* (2013.01)

(58) Field of Classification Search
  CPC .... G06F 1/189; G06F 1/3206; G06F 11/1004; H01B 9/003; H04B 3/542
  (Continued)

(56) References Cited

U.S. PATENT DOCUMENTS 4,344,076 A * 8/1982 Lewis .................... G08C 25/02
                                                        340/3.1
5,689,230 A * 11/1997 Merwin .............. H04L 12/2823
                                                        340/12.33
(Continued)

FOREIGN PATENT DOCUMENTS

| EP | 2274808 B1 | 9/2017 |
| EP | 3198792 B1 | 6/2018 |
| JP | 2015507466 A | 3/2015 |

OTHER PUBLICATIONS

Wikipedia page for X10 (industry standard) Dec. 24, 2018 (Year: 2018).*

(Continued)

*Primary Examiner* — Paul R. Myers
(74) *Attorney, Agent, or Firm* — Harness, Dickey & Pierce, P.L.C.

(57) ABSTRACT

The present disclosure relates to a system for at least one of identifying or verifying which specific data center device, from a plurality of data center devices, is being powered from an AC outlet of a power distribution unit. The system includes a message encoding algorithm module, a message decoding algorithm module and an input signal monitoring subsystem. The input signal monitoring subsystem monitors an AC power signal being supplied to the data center devices, wherein one of the data center devices includes an AC powered target device. A power distribution unit (PDU) supplies the AC power signal to the AC powered target device. The PDU has a controller which uses the message encoding algorithm to create a modulated AC power signal that includes an encoded message in accordance with a predetermined power cycle profile (PCP) event. The target device analyzes the PCP event as the modulated AC power signal is received and creates a decoded message therefrom.

(Continued)

The decoded message is used to indicate whether the AC outlet of the PDU is providing power to the target device.

24 Claims, 3 Drawing Sheets

(51) Int. Cl.
  *G06F 11/10* (2006.01)
  *H01B 9/00* (2006.01)
  *H04B 3/54* (2006.01)
(58) Field of Classification Search
  USPC .......................................................... 713/340
  See application file for complete search history.

(56) References Cited

U.S. PATENT DOCUMENTS

| | | | |
|---|---|---|---|
| 6,275,144 B1* | 8/2001 | Rumbaugh | H04B 3/54 |
| | | | 340/538.11 |
| 6,278,357 B1* | 8/2001 | Croushore | H04B 3/54 |
| | | | 340/534 |
| 6,377,163 B1* | 4/2002 | Deller | H02J 13/00009 |
| | | | 307/2 |
| 6,771,164 B1* | 8/2004 | Fink | H04L 12/12 |
| | | | 340/12.3 |
| 7,456,588 B2* | 11/2008 | Alexandrov | H05B 47/185 |
| | | | 315/294 |
| 8,504,857 B1* | 8/2013 | Robillard | G06F 1/3206 |
| | | | 713/324 |
| 8,661,283 B2 | 2/2014 | Turicchi, Jr. et al. | |
| 8,750,393 B1* | 6/2014 | Alshinnawi | H05K 7/1492 |
| | | | 375/257 |
| 8,886,985 B2 | 11/2014 | Somasundaram et al. | |
| 9,500,682 B1 | 11/2016 | Morales et al. | |
| 10,209,727 B2* | 2/2019 | Chapel | H01R 25/00 |
| 2006/0103504 A1 | 5/2006 | Vassallo | |
| 2008/0278296 A1* | 11/2008 | Noh | H04B 3/54 |
| | | | 375/259 |
| 2008/0317021 A1 | 12/2008 | Ives et al. | |
| 2009/0273334 A1* | 11/2009 | Holovacs | G06F 1/26 |
| | | | 324/66 |
| 2009/0307515 A1 | 12/2009 | Bandholz et al. | |
| 2010/0123598 A1* | 5/2010 | Brodersen | G08C 19/28 |
| | | | 340/12.22 |
| 2011/0222595 A1* | 9/2011 | Choi | H04B 3/548 |
| | | | 375/238 |
| 2012/0017102 A1* | 1/2012 | Turicchi, Jr. | G06Q 50/06 |
| | | | 713/300 |
| 2012/0083934 A1* | 4/2012 | Jesudason | G06F 1/3203 |
| | | | 700/291 |
| 2012/0091915 A1* | 4/2012 | Ilyes | H05B 47/185 |
| | | | 315/307 |
| 2013/0264889 A1* | 10/2013 | Quittek | H01H 47/00 |
| | | | 307/125 |
| 2014/0181564 A1* | 6/2014 | Alshinnawi | G06F 1/189 |
| | | | 713/340 |
| 2015/0220124 A1 | 8/2015 | LaBerge | |
| 2015/0282113 A1* | 10/2015 | Costa | H04W 64/003 |
| | | | 455/456.1 |
| 2017/0019151 A1* | 1/2017 | Kahn | H04B 3/548 |
| 2017/0264493 A1 | 9/2017 | Cencini et al. | |
| 2017/0354053 A1* | 12/2017 | Irons | H01R 25/165 |
| 2018/0004268 A1* | 1/2018 | Narita | G06F 1/28 |
| 2018/0210538 A1* | 7/2018 | Aimone | H05K 7/1492 |
| 2018/0373548 A1* | 12/2018 | Nassoura | H05K 7/1492 |
| 2019/0124074 A1* | 4/2019 | Weedermann | H04L 41/28 |

OTHER PUBLICATIONS

International Search Report and Written Opinion regarding International Application No. PCT/US2019/052281, dated Jan. 10, 2020.
Ferreira, A. et al. "BCID: An effective data center power mapping technology," IBM Research, 2012 International Green Computing Conference (IGCC), Jun. 4-8, 2012.

* cited by examiner

Encoding Method

Pulse Distance Bit Encoding
- Time between consecutive bits differs if logical "1' or "0"
- Bit error correction - interpolation and preimage Constant Overhead Byte Stuffing
- Overhead (OH) byte is pointer to first occurrence of data matching designated Frame (FR) value
- Subsequent matches are replaced or modified (MD) with pointer to next occurrence and so on
- Windows-1252 character encoding
- Payload: OH + PSN + HID + CRC + FR
  - PSN = Product Serial Number shown on nameplate
  - HID = Hardware ID, i.e. branch|| receptacle index
  - CRC-8 (poly=0x07, no transpose)
  - FR = 0xFF
- LSB shifted out first Power Cycle Profile (PCP)
- Cycle = number of single-cycle OFF periods
- Duty = number of consecutive ON cycles following each OFF cycle
  - Ex. C=2, D=10 means two power cycle drops spaced 10 cycles apart Original Message: PSN="1234 ÿ 67 ÿ 9a"; HID="A01"

| PSN[9:0] | | | | | | | | | | HID[2:0] | | | CRC |
|---|---|---|---|---|---|---|---|---|---|---|---|---|---|
| 13 | 12 | 11 | 10 | 9 | 8 | 7 | 6 | 5 | 4 | 3 | 2 | 1 | 0 |
| 31 | 32 | 33 | 34 | FF | 36 | 37 | FF | 39 | 61 | 41 | 30 | 31 | 2E |

Encoded Message

| OH | PSN[9] | PSN[8] | PSN[7] | PSN[6] | MD | PSN[4] | PSN[3] | MD | PSN[1] | PSN[0] | HID[2] | HID[1] | HID[0] | CRC | FR |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| 05 | 31 | 32 | 33 | 34 | 03 | 36 | 37 | 07 | 39 | 61 | 41 | 30 | 31 | 2E | FF |

FIGURE 3

SYSTEM AND METHOD FOR DETECTING RELATIONSHIP BETWEEN INTELLIGENT POWER STRIP AND DEVICE CONNECTED THERETO

CROSS-REFERENCE TO RELATED APPLICATIONS

This application claims the benefit of U.S. Provisional Application No. 62/744,477, filed on Oct. 11, 2018. The entire disclosure of the above application is incorporated herein by reference.

FIELD

The present disclosure relates to systems and methods for remotely detecting and identifying electrically powered devices, and more particularly to systems and methods for identifying which electrically powered devices are being powered from a particular rack power distribution unit.

BACKGROUND

The statements in this section merely provide background information related to the present disclosure and may not constitute prior art.

In a modern day data center there are frequently dozens, hundreds or even thousands of electrically powered devices being operated at a given time. Such devices may be servers, network switches, routers, and a wide variety of other data center components. Typically two or more such components are coupled to a rack power distribution unit ("rPDU"), which is sometimes also referred to as an "intelligent power strip." A modern day rPDU is rack mountable in a standard equipment rack and typically includes a plurality of AC power outlets. The rPDU distributes received AC power from an AC supply source in the data center to one or more data center devices which have their AC power cords coupled to the PDU's AC power outlets, and which are also typically mounted in the same equipment rack as the rPDU. The rPDU may include its own electronic controller which can communicate with other upstream devices. The rPDU also may include an independently controllable power switch, controllable by its associated controller, which enables each outlet of the rPDU to be independently turned on and off. This capability enables the rPDU to be commanded by an upstream device or application to selectively turn on and off AC power to an associated AC receptacle of the rPDU, to thus control power being applied to a specific data center device being powered from that specific AC power outlet of the rPDU. This controller commanded controlled On/Off switching capability enables various data center devices being powered from a given rPDU to be power cycled on and off remotely by a data center worker through a suitable control application.

It is important in modern day centers to know exactly which data center devices are coupled to which rPDU. By knowing which devices are being powered from which rPDU, remote control over the On/Off operation of a given data center device can be undertaken with confidence. This is especially important because it is often necessary for data center personnel to be able to remotely power cycle a data center device (e.g., a server) to re-boot it. However, as equipment is frequently moved within a data center, it becomes necessary to periodically determine/verify exactly what data center device is coupled to a given rPDU, and more typically what data center device is coupled to a specific AC outlet of a given rPDU. This identification/discovery operation may be performed manually by a data center worker physically inspecting each piece of data center equipment and noting exactly which rPDU, and more typically which rPDU outlet, each data center device is connected to. As will be appreciated, however, this can be an extremely time consuming operation, particularly if the data center has a large plurality (e.g., hundreds or thousands) of devices that have to be periodically checked to ensure that asset tracking records associating them with particular rPDU outlets are valid and up to date.

Still another reason for having an accurate asset tracking record of which data center device is coupled to which power outlet of each rPDU is for when it is necessary to sequentially start up a number of different data center devices, which are all controlled by a common upstream circuit breaker. In this instance it becomes important to avoid creating excessive in-rush currents that would otherwise trip the upstream circuit breaker. Knowing with confidence exactly what data center device is coupled to each outlet of a given rPDU enables the data center worker to sequentially power cycle "On" specific data center devices that are all controlled from a common breaker, and thereby eliminate the chance of inadvertently tripping the circuit breaker when powering up a plurality of data center devices.

Some attempts have been made to automate the above described identification process. These attempts have typically involved sending a command to a target data center device to power cycle the device, and then noting at which rPDU (or rPDU outlet) a current drop occurred when the target device was powered down. Obviously, the disadvantage here is that the target device has to be powered down. If the device is a server supporting one or more applications being used by various users, this can be a significant inconvenience to the users. The need to power cycle other devices, for example network switches, can also be quite disruptive to users who are accessing/using the various data center devices. Also, data center workers are sometimes uncomfortable with remotely powering down specific servers through commands to a specific rPDU outlet, on the off chance that the server they think they are commanding to be power cycled is in fact connected to a different rPDU outlet, which thus will result in inadvertently powering down the wrong server. Still other attempts at identifying remote devices have involved using an application or agent that causes more resources to be used in a deterministic way (e.g., ramping internal fans of remote devices up and down periodically). These attempts have likewise met with limited success.

In view of the foregoing, a system and method for identifying/verifying which data center devices are being powered from a specific rPDU AC power outlet, and doing so in a manner which is not disruptive to the data center devices and does not require powering down the data center devices as part of the testing process, would be very valuable.

SUMMARY

This section provides a general summary of the disclosure, and is not a comprehensive disclosure of its full scope or all of its features. In one aspect the present disclosure relates to a system for at least one of identifying or verifying which specific data center device, from a plurality of data center devices, is being powered from an AC outlet of a power distribution unit. The system may comprise a message encoding algorithm module, a message decoding algorithm module and an input signal monitoring subsystem. The input signal monitoring subsystem may operate to monitor an alternating current (AC) power signal being supplied to the data center devices, wherein one of the data center devices includes an AC powered target device. The AC powered target device may include an AC power inlet for receiving the AC power signal, and a processor in communication with the input signal monitoring subsystem. The system may further include a power distribution unit (PDU) for supplying the alternating current (AC) power signal to the AC powered target device. The PDU may include a controller which is in communication with the message encoding algorithm. The controller may be configured to use the message encoding algorithm to create an encoded message in accordance with a predetermined power cycle profile (PCP) event. The PCP event may be implemented by the PDU generating a modulated AC power signal encoded with the PCP event, and wherein the modulated AC power signal is sufficient in magnitude so as not to cause a loss of power or a brownout condition that causes rebooting of an AC powered data center device. The target device may further be configured to analyze the PCP event as the modulated AC power signal is received and to create a decoded message therefrom. The decoded message is used to indicate whether the AC outlet of the PDU is providing power to the target device.

In another aspect the present disclosure relates to a system for at least one of identifying or verifying which specific data center device, from a plurality of data center devices, is being powered from an AC outlet of a power distribution unit having a plurality of AC outlets. The system may comprise a message encoding algorithm configured to encode an AC power signal with a power cycle profile (PCP) event repeated at varying time intervals, which represents an encoded message carried by the AC power signal. The system may also include a message decoding algorithm for decoding the encoded message in the encoded AC power signal, as well as an AC power monitoring subsystem for monitoring the AC power signal. The system may further include a power distribution unit (PDU) for supplying the AC power signal to the plurality of data center devices. The PDU may include a controller which is configured to access and use the message encoding algorithm to generate the encoded message in the AC power signal. The system may further include the use of an AC powered target device, which itself includes an AC power inlet for receiving the AC power signal from the PDU, a main processor, a service processor and a communications port in communication with the service processor. The service processor is configured to access and use the AC power monitoring subsystem and the message decoding algorithm to decode the encoded message in the AC power signal, and to create a decoded message therefrom which is indicative of which PDU outlet is providing power to the AC powered target device. The service processor is further configured to transmit the decoded message to a remote system using the communications port.

In still another aspect the present disclosure relates to a method for at least one of identifying or verifying which specific data center device, from a plurality of data center devices, is being powered from a specific AC power outlet of a power distribution unit (PDU). The method may comprise using the PDU to supply an alternating current (AC) power signal to at least one target device via the specific AC power outlet of the PDU. The method may further include using the PDU to modulate the AC power signal in accordance with a predefined power cycle profile (PCP) event repeated a plurality of times in accordance with a predetermined repetition pattern of varying time intervals. The PCP events may represent an encoded message which does not cause a reduction in AC power sufficient to result in rebooting of the at least one target device being powered by the AC power signal. The method may further include using the target device to receive the encoded message via the AC power signal and to decode the encoded message to produce a decoded message. The method may further include using the decoded message to determine if the target device is receiving the AC power signal from the specific AC power outlet of the PDU.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. In the drawings.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
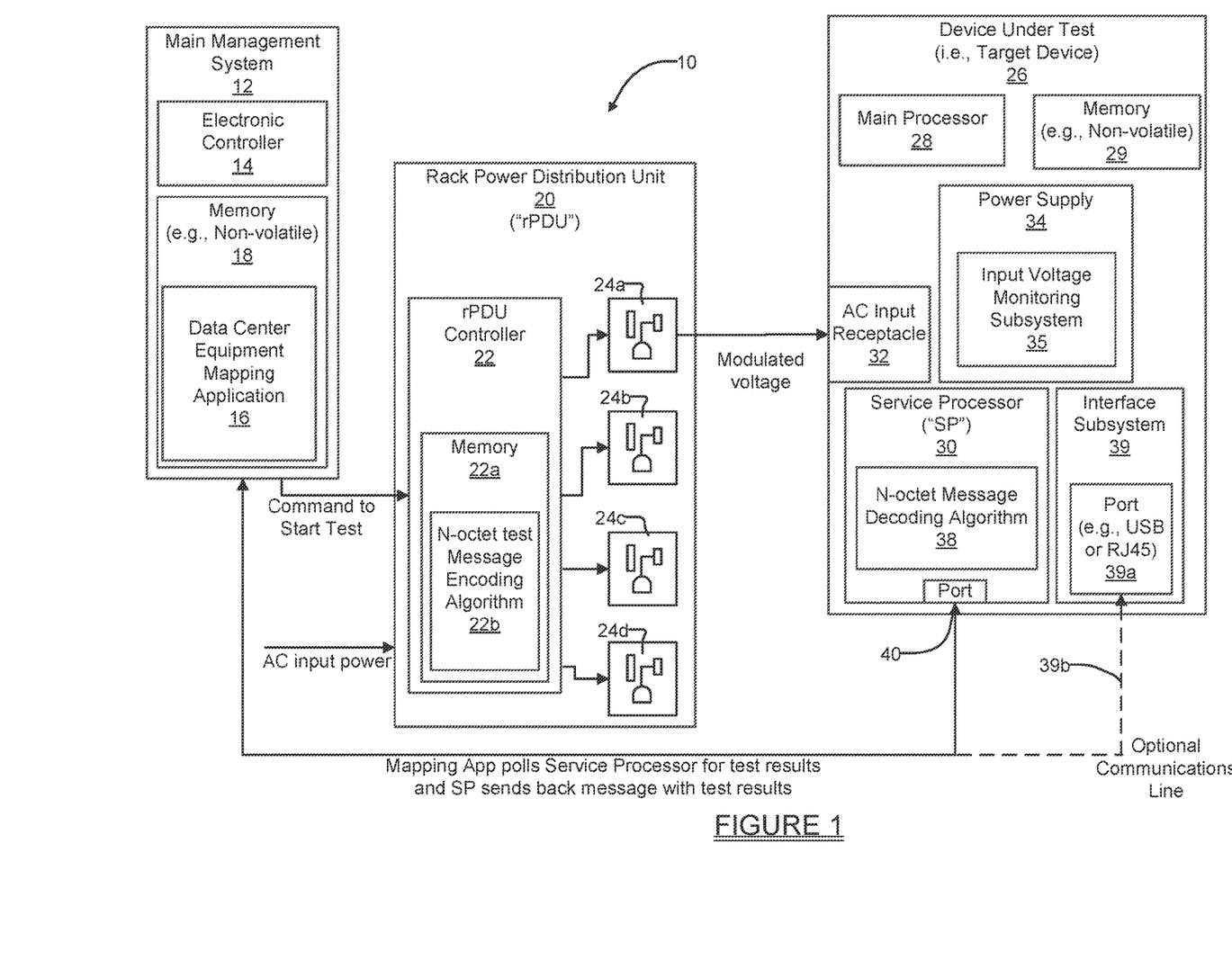
FIG. 1 is a high level block diagram of one system in accordance with the present disclosure for identifying which data center devices are being powered from a given rPDU AC power outlet.

Referring to FIG. 1, a system 10 in accordance with one embodiment of the present disclosure is illustrated. The system 10 may include a main management system 12 having an electronic controller 14 and a data center equipment mapping application 16 (hereinafter simply "mapping application" 16). The mapping application 16 may be stored in a non-volatile memory 18 (e.g., RAM, ROM, etc.) which is in communication with the electronic controller 14. A rack power distribution unit ("rPDU") 20 is in communication with the main management system 12 and also with a source of AC power. The rPDU 20 includes a rPDU controller 22 and one or more AC power outlets 24*a*-24*d*. In this example the rPDU 20 is shown having four AC power outlets 24*a*-24*d*, although it will be appreciated that the rPDU may have less than or more than four AC power outlets. Each AC power outlet 24*a*-24*d* may be turned on and off independently by the rPDU controller 22, and each receives AC input power from an external AC input supply power source. In this example, the rPDU 20 also includes a non-volatile memory 22*a* (e.g., RAM, ROM, etc.) which stores a message encoding algorithm 22*b* that is used to generate the encoded message. It should be appreciated that the encoding algorithm 22*b* does not need to reside within the rPDU 20, but may be stored in memory elsewhere (e.g., in memory 18 of the main management system 12) and accessed by the rPDU controller 22 when required.

FIG. 1 also shows a device under test 26, which will be referred to as the "target device" 26 in the following discussion. The target device 26 may be any data center component, for example a server, a router, a network switch, etc., that incorporates a service processor. The target device 26 in this example has a main processor 28, a service processor 30, an AC input receptacle 32, and a power supply 34.

Those skilled in the art will understand that the service processor 30 (also known as a Baseboard Management Controller) is a specialized microcontroller that is often included in a wide range of data center devices such as servers, CRAC units, PDUs, etc. The service processor 30 is often embedded in the motherboard of the device (e.g., a server), or in a PCI card, or on a server chassis. It is independent of the main CPU and operating system (OS) of the device, and is accessed via an Ethernet interface, either dedicated (out-of-band) or shared with the data Ethernet (sideband). Service processor 30 functions may include, without limitation, one or more of remote power cycling, remote console access via KVM, monitoring of on-board instrumentation (e.g., temperature, CPU status and utilization, fan speed, input voltage monitoring), setting event traps, and OS-level shutdown.

In one embodiment the power supply 34 incorporates an input voltage monitoring subsystem 35 which is able to monitor the input supply voltage received at the AC input receptacle 32 and report same to the main processor 28 as well as to the service processor 30. In one embodiment the target device 26 may also include an interface subsystem 39 having at least one port 39a (e.g., USB, RJ45, etc.) commonly used to communicate with external subsystems and computers.

It will be appreciated that the input voltage monitoring performed by the input voltage monitoring subsystem 35 could alternatively be performed by a separate voltage monitoring module coupled to the AC input receptacle 32, which directly receives the input AC power signal, and is able to communicate voltage measurement information to the target device 26 when requested by the main processor 28, or to the service processor 30. Still further, the service processor 30 may include input power monitoring circuitry. For the purpose of the following discussion it will be assumed that the AC input receptacle 32 is coupled to AC power outlet 24a and that the target device 26 includes the input voltage monitoring subsystem.

In one embodiment the service processor 30 is programmed with a decoding algorithm 38, which in one example enables the service processor to decode a coded, modulated input voltage it receives on its AC input receptacle 32 from the outlet 24a of the rPDU 20. It should be appreciated that the decoding algorithm 38 does not need to reside within the service processor 30, and in another embodiment the decoding algorithm 38 is stored in a memory device external to the service processor (e.g., in the memory 18 of the main management system 12, or optionally in the memory 29 of target device 26, or in some other component in communication with the target device), but in any instance it will be accessible to the service processor 30 during testing. The service processor 30 also has a bi-directional communications port 40 (typically an Ethernet port) in communication with the main management system 12, typically via a network (e.g., management network) at the data center where the target device 26 is being used.

The system 10 uses the mapping application 16 running on the main management system 12 to send a command to the rPDU controller 22 to begin carrying out a discovery process by modulating the output voltage on the outlet 24a in accordance with a stored test message sequence. The test message causes a controlled series of short duration (typically only one line cycle, e.g., at 60 Hz) interruptions to be applied to the outlet port 24a of the rPDU 20. The short duration input voltage interruptions are applied in accordance with predetermined pulse distance encoding intervals, to be discussed in the following paragraphs. Each of the input voltage interruptions are of sufficiently short duration that they do not cause loss of power or brownout condition that may result in re-booting of the target device 26, but are still detectable by the service processor 30 using the input voltage monitoring subsystem 35.

The short duration input voltage interruptions are defined by one or more different "power cycle profile" ("PCP") events which controllably disable and re-enable AC power from the rPDU 20 to the AC input receptacle 32 in accordance with slightly differing predetermined On/Off sequences. The PCP can be programmatically configured in accordance to desired timing parameters. As one example, the power "off" duration may be fixed to a single full-line cycle, although fractional line cycle power switching is possible. It is not recommended to switch power off for longer than a single line cycle. A more sophisticated PCP may be designed with a programmable "burst interval," as well, which may be set short or long (2× short). The burst interval is known by the service processor 30 via the decoding algorithm 38, and as such it is able to decode the binary code. In view of the foregoing, one example of the PCP event may be defined by three variables as follows:

Cycle=number of consecutive repetitions of PCP. If cycle=1, then only a single off power cycle occurs regardless of duty value.

Duty=number of consecutive ON cycles following single OFF cycle to complete the PCP.

Burst=number of times PCP cycle is repeated over N seconds.

A precisely controlled PCP, which is repeated over a given period of time, induces a measurable and consistent voltage change on the AC voltage being input to the target device's AC input receptacle 32. This voltage change is reliably detected by the service processor 30. However, it will be appreciated that the system 10 is not limited to use with any particular PCP profile or pattern; the important feature of the PCP is that it can produce a controlled series of short term power disruptions that can be detected by the service processor 30, but without causing power loss or brownout condition that may result in re-booting of the target device 26. The message decoding algorithm 38 may recognize if this pattern is repeated every few seconds, for example every three seconds or every two seconds.

It will also be appreciated that any persistent power supply disruption to the target device 26 may be more likely to cause a re-boot of the device if the target device is operating at a lower voltage range (e.g., 120 VAC vs. 240 VAC). Accordingly, an "optimal" PCP may exist that is compatible with minimum operating AC voltage and maximum current draw of a specific target device (e.g., a typical server). In practice, the optimal PCP could be experimentally determined or learned at run time by starting with a minimally invasive PCP, i.e., mostly powered on, consisting of cycle=2, duty=10, and burst=10, for example, and gradually decrementing cycle and/or duty, but not to program a combination of parameters known to precipitate full power loss, which would thus cause a re-boot of the device. This iterative process would converge to an optimal PCP that results in no more than a 10% measurable RMS voltage drop from minimum rated value.

Figure 3:
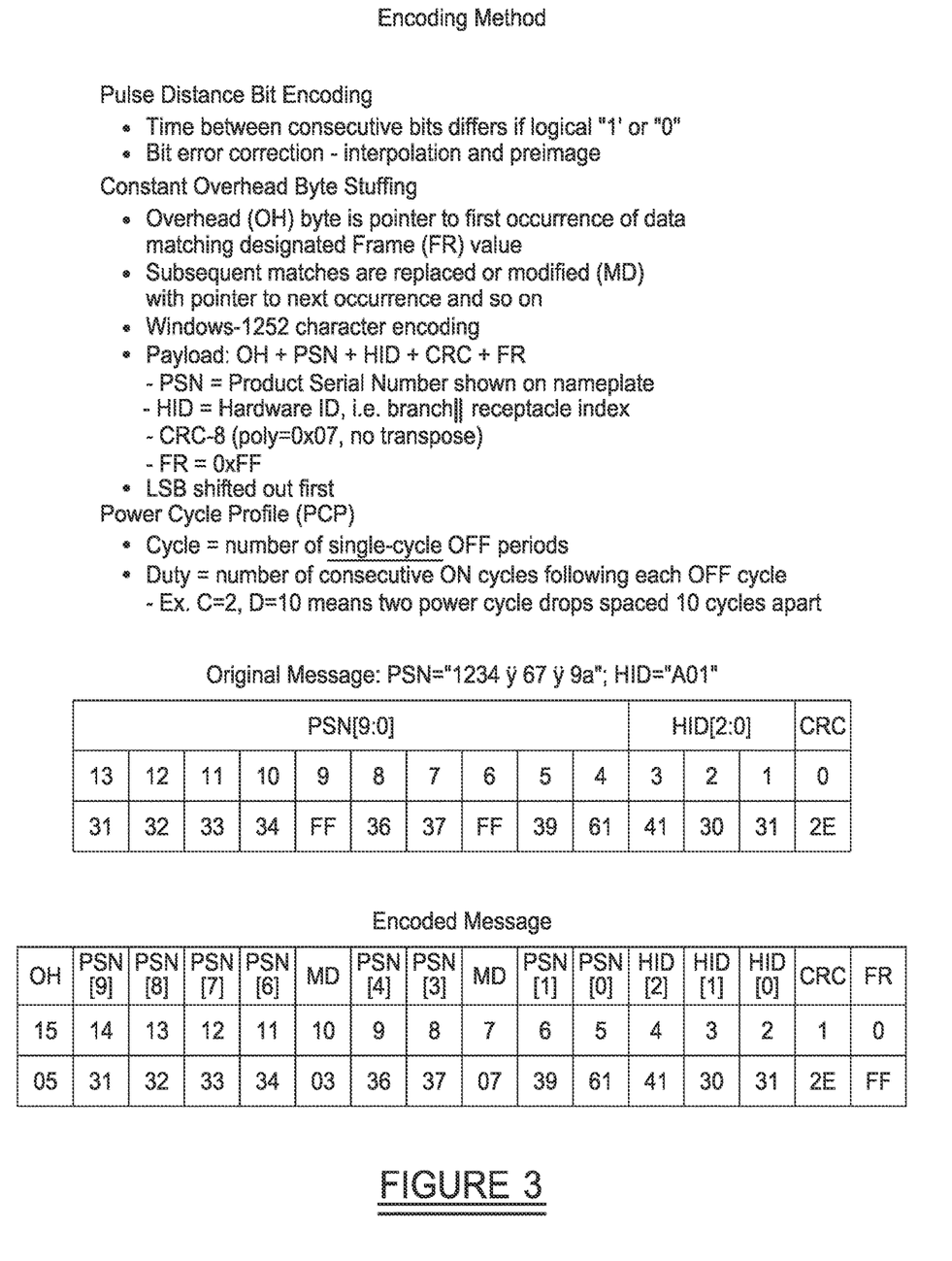
FIG. 3 illustrates one example of an encoding method that may be used to create an original message including various information concerning a specific target device, as well as the encoded message that is created by the service processor using its decoding algorithm.

An encoding algorithm may be utilized to achieve the desired bit encoding through a pulse distance bit encoding technique that differentiates between a zero bit and a one bit to issue the PCP event at variable time intervals. One example of how a suitable encoding algorithm may be used to construct a message is shown in FIG. 3. The encoding algorithm shown in FIG. 3 in one example makes use of pulse distance bit encoding and constant overhead byte stuffing ("COBS") to create an encoded message that includes the product serial number ("PSN") of the target device 26, a hardware ID (i.e., branch/receptacle index number, designated by "HID"), a cyclic redundancy check ("CRC") value, and a "Frame Rate" value ("FR"). An overhead ("OH") byte acts as a pointer to a first occurrence of data matching the designated Frame Rate (FR) value. The resulting encoded message is also shown in FIG. 3. Again, this is but one example of how an encoded message may be constructed, and the present system 10 is not limited to use with any one specific type/format of encoded message.

To decode the encoded message completely, the decoded bits may be packed into N-octets (8-bit packets) and the computed CRC of the octets is compared against the received CRC in the message. A match means the message is valid. If the CRC is invalid, then the PCP process may continue indefinitely, i.e., the rPDU 20 repeats the same message, until a valid CRC is computed or if a process timeout occurs.

As a high level summary, the operations performed by the service processor 30 in decoding the N-octet message may be summarized as follows:

a) Initially calculate voltage differences so a relative change or disturbance is detected. The target device 26 may operate at 120V, 208V, or 230V, for example, but the service processor 30 does not require knowledge about absolute operating voltage to establish the needed voltage thresholds.

b) The target device's 26 power supply voltage disturbances can be inconsistent and imprecise in shape and magnitude depending upon the current draw profile of the target device and the polling interval of the service processor 30, so a cluster of probable detections can occur about the actual event.

c) The service processor 30 may collect the raw voltages and save them to a memory buffer, so the algorithm runs in parallel processing the buffer as it grows in samples. One or more other buffers may be created to save the partial results until the a priori number of bits is captured, then the message may be decoded using COBS method. The memory buffer strategy and number of discrete calculation steps may be varied at the programmer's discretion.

d) From operation b) above, a 3-bit "OR" operation smooths the marker data to find the first and last edge of the cluster of probable detected events and timestamps these edges to define the marker boundary.

e) The median timestamp of the marker boundary is then used for the sequential delta timestamp processing to correlate to the ideal zero and one-bit timing intervals.

f) To even more reliably detect the bits, the service processor 30 bit decoding process may perform multiple passes through the sample data as the N-octet message is repeated by the rPDU 20. Also, a faster and consistent service processor 30 polling rate with respect to the bit's pulse distances will improve the detection performance even further.

Detailed specific operations in decoding the received message may involve the following operations:

1) Apply a running $1^{st}$ order backward difference approximation to x[n] time series of instantaneous voltage data to remove voltage measurement offset and slow drift as y[n].

$$y[n]=x[n]-x[n-1] \qquad \text{(Equation 1)}$$

2) Apply a symmetrical digitization threshold for y[n] to detect or mark the voltage disturbance as z[n]. It produces two or more markers per each disturbance, with the number dependent upon the monotonicity of y[n].

$$z[n] = \begin{cases} 1, & |y[n]| > 0.25 \text{ V} \\ 0, & |y[n]| \leq 0.25 \text{ V} \end{cases} \qquad \text{(Equation 2)}$$

3) Apply a running 3-point Boolean OR to z[n] to define the marker boundaries or edges as u[n].

$$u[n]=z[n]Vz[n-1]Vz[n-2] \qquad \text{(Equation 3)}$$

4) Calculate central or median value of timestamps $t_c[n]$ of markers u[n]. Every marker is bounded by a first 0-to-1 and last 1-to-0 transition.

5) Calculate $\Delta t_c[n]$ between successive central timestamps of markers u[n].

6) Determine zero or one bit value with tolerance. "X" means $\Delta t_c[n]$ was out of bounds and the bit could not be resolved.

$$\text{Bit} = \begin{cases} 1, & 1.75 \text{ s} \leq \Delta t_c[n] \leq 2.25 \text{ s} \\ 0, & 2.75 \text{ s} \leq \Delta t_c[n] \leq 3.25 \text{ s} \\ X, & 1.75 \text{ s} < \Delta t_c[n] \vee \Delta t_c[n] > 3.25 \text{ s} \end{cases}$$

7) Search framing bits for start, pack bits into bytes, and compute payload per COBS decoding.

It will be appreciated that with regard to operation 6) above, that a one-bit represents a 2 second duration and a zero-bit represents a 3 second duration for the pulse distance encoding method. These time intervals may be varied, and the present system and method is not tied to use with any specific time intervals. However, the time intervals should be spaced sufficiently far apart so that the algorithm can easily detect a timing difference, especially when the service processor 30 polling interval is "slow", e.g., a voltage sample once every 250 ms.

Also, it will be appreciated that the techniques of interpolation and "preimage" may be used with the present system and method. When using interpolation, if a bit was missed in operation 6) above, the missed bit could be guessed depending upon the delta timestamp. For example, if $\Delta t_c[n]$ was 6 seconds, which is too large for a single bit interval, because 6 is a multiple of a zero-bit interval of 3 seconds, there must have been a missed zero bit at the 3 second mark. It could not have been a one-bit because the $\Delta t_c[n]$ would need to equal 5 seconds. The preimage technique involves guessing missing bits so that a calculated CRC matches the received CRC. Regardless if these techniques are used to speed up the decoding process, the message is repeated until the service processor 30 detects all the missing bits and validates the CRC or a process timeout occurs.

Optionally, the service processor 30 could have a less sophisticated construction and just have the capability to serve the decoded bits back to the mapping application 16, and then the mapping application would use the decoded bits to decode the message. Both implementations are contemplated by the present disclosure.

It will also be appreciated that while the encoding/decoding algorithm needs to be known in advance by the rPDU 20 and the service processor 30, and possibly also by the mapping application 16, the encoding/decoding algorithm can be changed as needed. While the pulse distance bit encoding and COBS protocols work well together, other protocols may potentially be used, and the present system 10 and method are not limited to any specific message protocol/construction.

It will also be appreciated that the message size (i.e., "N" octets) may have an arbitrary length, as long as the rPDU 20 and the service processor 30 are encoding/decoding with the same algorithm. The fewer the octets, the faster the message is transmitted, but the message needs to be at least large enough to convey rPDU identity and the index of the outlet being used on the rPDU 20 for the test.

Figure 2:
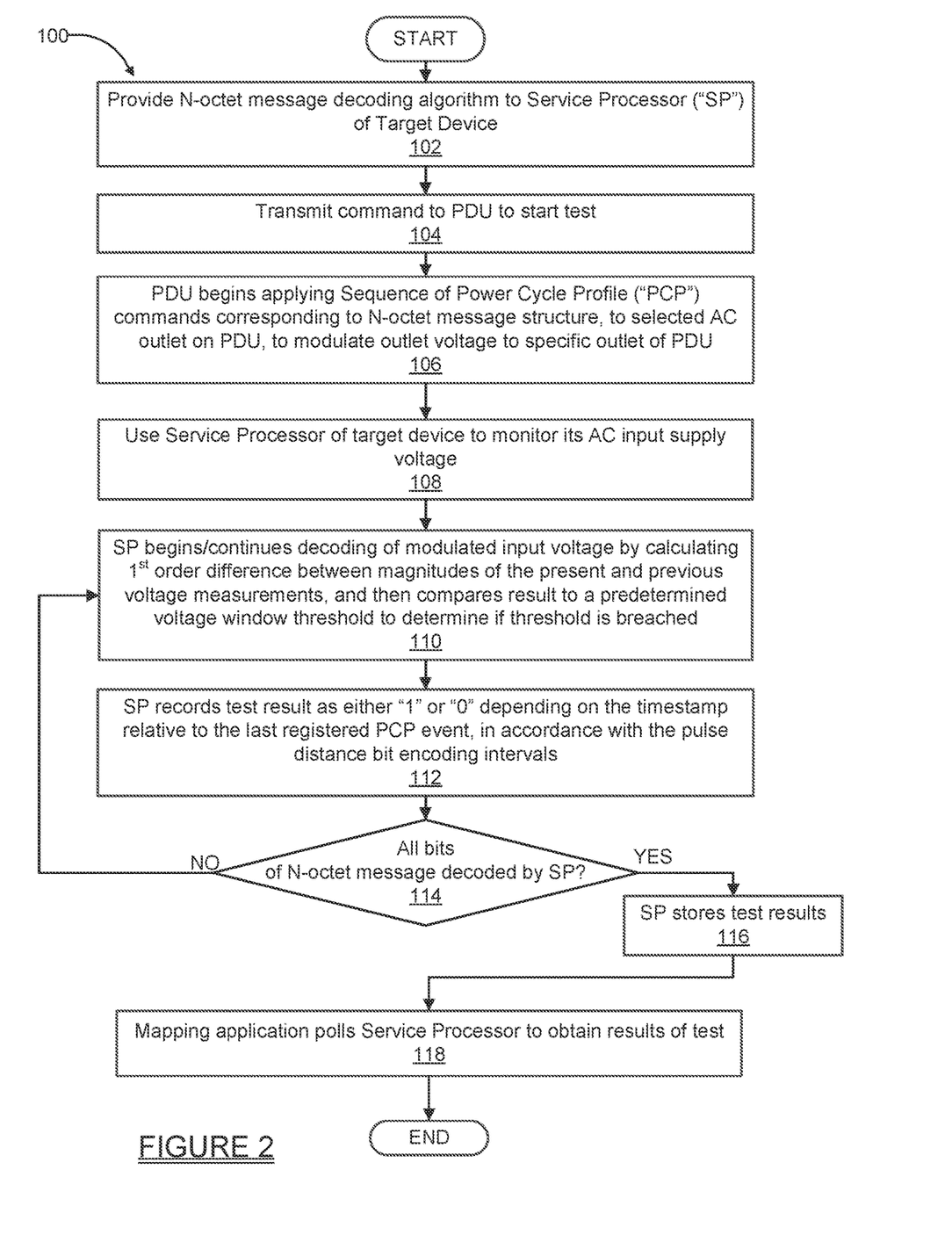
FIG. 2 is a high level flowchart setting forth operations that describe how the system of FIG. 1 is operated to identify when a specific target device is coupled to a specific rPDU AC power outlet.

Referring to FIG. 2, a flowchart 100 is shown which sets forth operations involving the use of the N-octet message to enable the system 10 to implement identification/verification of the target device 26. At operation 102 the N-octet message decoding algorithm is provided to the service processor 30 of the target device 26. This may occur when the target device 26 is initially installed in the data center or at some time thereafter. At operation 104 the mapping application 16 transmits a command to the rPDU 20 to begin the verification/discovery operation of a specific target device 26 coupled to AC outlet 24a.

At operation 106, the rPDU controller 22 begins applying the sequence of PCP events (i.e., commands) to the selected AC outlet 24a on the rPDU 20. This causes a series of short duration AC power interruptions at the target device's AC input receptacle 32, which may be repeated in one, two or more different repetition patterns. Again, these AC power supply interruptions are of sufficiently short duration that they do not cause loss of power or brownout condition that may result in rebooting of the target device 26, but they are still detectable by the input voltage monitoring subsystem 35 of the target device 26.

At operation 108 the service processor 30 uses the input voltage monitoring subsystem 35 to monitor the AC input supply voltage at the target device's AC input receptacle 32. At operation 110 the service processor 30 calculates the $1^{st}$ order difference between the magnitudes of the present and previous voltage measurements, and then compares this calculated $1^{st}$ order difference to a predetermined voltage window threshold. At operation 112, if the threshold is breached, then the service processor 30 registers the PCP event as either a "0" bit or a "1" bit, depending upon the timestamp relative to the last registered PCP event, in accordance with the pulse distance bit encoding intervals known from its decoding algorithm 38.

At operation 114 the service processor 30 checks if all bits of the encoded N-octet message have been decoded. If they have not, then operations 110 and 112 are repeated. Once all bytes have been decoded, the service processor 30 may store its test results, as indicated at operation 116, until the mapping application 16 polls the service processor 30, as indicated at operation 118, with a request for the results. Once the mapping application 16 has obtained the decoded message from the service processor 30 it may then determine if the bits reported by the service processor 30 correspond to the encoded message.

The operations described above in connection with FIG. 2 may be repeated for each AC power outlet 24a-24d of the rPDU 20, and for every rPDU in a data center. The identification/verification described in connection with FIG. 2 may be performed on a periodic basis (e.g., monthly) or right after a new target device has being installed in the data center, or possibly in response to some triggering event (e.g., reconfiguration of a given rack with new/different equipment) to ensure that records detailing exactly what rPDU outlets are coupled to what data center devices are accurate and up to date.

To power cycle the AC power outlets 24a-24d, the use of low cost, electromechanical, bistable relays may be preferred. These may be integrated into the manufacture of the rPDU 20 if the rPDU does not already include suitable switching components for carrying out the needed short duration power switching. The periodic and repetitive power switching is at a duty cycle greater than required for typical switching applications with rPDUs. To achieve the needed precision, coordination and reliability of the power cycle controls required, particular design considerations should preferably be met. These include, but are not limited to, protecting the contacts from destruction due to inrush current, protecting the contacts from arcing under heavy and/or low power factor loading conditions, and establishing initial power state after power cycle for proper device startup and commissioning. These factors may or may not require modification to some models of rPDUs currently being used in modern day data centers.

Optionally, a hybrid power control method may be used that comprises a parallel electrical connection between an electromechanical relay and solid-state switches, for example, triacs or anti-parallel SCRs. This more expensive solution would allow precise phase controlled switching to also modulate the voltage output. For example, the relay contacts would first be opened so that the solid-state switches could be triggered on at various conduction angles and naturally commutated off to precisely control the voltage output without turning off completely for a full line cycle. This method would mitigate the risk of inadvertent re-booting the target device caused by a power loss or brownout condition. After the message is received, then the relay's contacts would engage to shunt the solid-state devices and reduce power dissipation. A solid-state only power control means is possible as well, but the continuous power dissipation may be an additional challenge to address.

While the foregoing description has focused around a PDU having a plurality of AC outlets that can be switched independently, it will be appreciated that the invention is not so limited. The various embodiments disclosed herein may be used with a PDU having only a single AC outlet, or a plurality of unswitched AC outlets. In either case, the system 10 and method may be used to identify/verify that a specific PDU is providing power to one or more specific data center devices. As one example, the input or branch circuits of the rack PDU 20 may utilize relay and/or solid-state switching to "broadcast" the encoded message simultaneously to numerous target devices. While the outlet identity cannot be resolved for unswitched AC outlet model PDUs, the PSN and a portion of the HID information can be transmitted and the power supplying relationship established.

Still further, while the foregoing discussion has explained the service processor 30 being used to perform the message decoding, this functionality could instead be performed by the main processor 28 of the target device 26, assuming the main processor 28 is able to access and use both the message decoding algorithm 38 and the input voltage monitoring subsystem 35. In that event, the target device 26 may communicate via a separate communications line 39b, as shown in FIG. 1, to communicate the decoded message to the main management system 12. Thus, the system 10 is not limited to use with only target devices that incorporate a service processor, although the presence of a service processor in the target device makes for an especially easy and elegant implementation.

The present system 10 and method thus enables an identification/verification process to be carried out which quickly and easily enables a check to be made as to whether a specific target device is coupled to a specific AC outlet of a specific rPDU. Importantly, the system 10 and method carries out this identification/verification process without re-booting the target device, and without interrupting operation of the target device in any way. An advantage is that the system 10 makes use of the existing service processor of the target device, which leaves the main controller/processor of the target device free to handle the applications and/or processing tasks which the target device is intended to handle. The system 10 further does not require any physical modifications to the target device, nor is it necessary for a data center worker to walk out to the target device (or the rPDU to which the N-octet message is being transmitted) and perform any type of reconfiguration of the controls on the target device.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for at least one of identifying or verifying which specific data center device, from a plurality of data center devices, is being powered from an AC outlet of a power distribution unit, the system comprising:
    a message encoding algorithm module;
    a message decoding algorithm module;
    an input signal monitoring subsystem for monitoring an alternating current (AC) power signal being supplied to the data center devices, wherein one of the data center devices includes an AC powered target device;
    an AC powered target device including;
        an AC power inlet for receiving the AC power signal;
        a processor in communication with the input signal monitoring subsystem;
    a power distribution unit (PDU) for supplying the alternating current (AC) power signal to the AC powered target device, the PDU including a controller, the controller being in communication with the message encoding algorithm and configured to use the message encoding algorithm to create an encoded message in accordance with a predetermined power cycle profile (PCP) event, the PCP event being implemented by the PDU to act directly on the AC power signal to generate a modulated AC power signal encoded with the PCP event, and wherein the modulated AC power signal differs from the AC power signal through an implementation of a sequence of detectible, temporary reductions in magnitude of the AC power signal, which represent the PCP event, but where the modulated AC power signal is still sufficient in magnitude to avoid causing a loss of power condition or a brownout condition that causes rebooting of an AC powered data center device; and
    the target device further configured to analyze the PCP event as the modulated AC power signal is received, and to create a decoded message therefrom, the decoded message being used to indicate whether the AC outlet of the PDU is providing power to the target device.

2. The system of claim 1, further comprising a main management system in communication with the PDU, and configured to transmit a message to the PDU to begin a discovery process by implementing the modulation of the AC power signal in accordance with the PCP event.

3. The system of claim 2, wherein the target device further comprises a communications port for sending the decoded message back to the main management system.

4. The system of claim 3, wherein the processor of the target device comprises a service processor, and wherein the communications port is in communications with the service processor.

5. The system of claim 1, wherein the PCP event causes a series of predetermined duration power disruptions in the modulated AC power signal being applied to the target device.

6. The system of claim 5, wherein the PDU is configured to repeat the PCP event a plurality of times, and at varying time intervals, as the modulated AC power signal is being provided to the target device.

7. The system of claim 6, wherein the PCP event results in no more than a 10% measurable RMS voltage drop from minimum rated value of the AC power signal, as the modulated AC power signal is being supplied to the target device.

8. The system of claim 7, wherein the PDU is configured to use pulse distance bit encoding to create an encoded message comprised of a plurality of one bits and zero bits, which collectively define when commands to carry out the PCP event are to occur.

9. The system of claim 8, wherein the encoded message with the one bits and the zero bits is further configured to cause the commands to carry out the PCP event to occur at selected, variable time intervals.

10. The system of claim 9, wherein the encoded message includes at least one of:
    a product serial number of the target device;
    a hardware identification including at least one of a branch/receptacle index number;
    a cyclic redundancy check (CRC) value; or
    a frame rate value.

11. The system of claim 10, wherein the encoded message includes all of the product serial number, the hardware identification, the cyclic redundancy check (CRC) value and the frame rate value.

12. The system of claim 11, wherein the system of the target device is configured to use the message decoding algorithm to:
    decode bits of the message;
    to pack the bits into 8-bit packets;
    to compute a cyclic redundancy check value of the 8-bit packets; and
    to compare the computed cyclic redundancy check value with the CRC value of the encoded message, to verify that the encoded message was correctly received.

13. The system of claim 12, wherein the target device further comprises a communications port for sending the decoded message back to the main management system; and wherein the main management system includes a mapping application configured to determine if the encoded message matches the decoded message received from the target device.

14. A system for at least one of identifying or verifying which specific data center device, from a plurality of data center devices, is being powered from an AC outlet of a power distribution unit having a plurality of AC outlets, the system comprising:
- a message encoding algorithm configured to encode an AC power signal with a power cycle profile (PCP) event repeated at varying time intervals, which represents an encoded message carried by the AC power signal;
- a message decoding algorithm for decoding the encoded message in the encoded AC power signal;
- an AC power monitoring subsystem for monitoring the AC power signal;
- a power distribution unit (PDU) for supplying the AC power signal to the plurality of data center devices, the PDU including a controller, the controller configured to access and use the message encoding algorithm to generate the encoded message in the AC power signal to form a modulated AC power signal having a sequence of detectible, temporary reductions in magnitude created directly in the AC power signal;
- an AC powered target device including:
  - an AC power inlet receiving the AC power signal from the PDU;
  - a main processor;
  - a service processor; and
  - a communications port in communication with the service processor; and
  - the service processor being configured to access and use the AC power monitoring subsystem and the message decoding algorithm to decode the encoded message in the AC power signal, and to create a decoded message therefrom which is indicative of which PDU outlet is providing power to the AC powered target device; and
- the service processor further being configured to transmit the decoded message to a remote system using the communications port.

15. The system of claim 14, further comprising a main management system in communication with the PDU, and configured to transmit a message to the PDU to begin a discovery process by transmitting the encoded message to the target device.

16. The system of claim 14, wherein the message decoding algorithm is stored in a memory of the AC powered target device.

17. The system of claim 14, wherein the message encoding algorithm is stored in a memory of the PDU.

18. The system of claim 14, wherein both the message encoding algorithm and the message decoding algorithm are provided to the PDU and the AC powered target device, respectively, from at least one remote subsystem.

19. The system of claim 14, wherein the AC powered target device includes the AC power monitoring subsystem.

20. The system of claim 14, wherein each said PCP event results in no more than a 10% measurable RMS voltage drop from a minimum rated value of the AC power signal being supplied to the AC powered target device.

21. The system of claim 14, wherein the PDU is configured to use pulse distance bit encoding to create the encoded message, the encoded message being comprised of a plurality of one bits and zero bits, which collectively define when commands to carry out the PCP event are to occur.

22. The system of claim 21, wherein the encoded message includes at least one of:
- a product serial number of the target device;
- a hardware identification including at least one of a branch/receptacle index number;
- a cyclic redundancy check (CRC) value; or
- a frame rate value.

23. A method for at least one of identifying or verifying which specific data center device, from a plurality of data center devices, is being powered from a specific AC power outlet of a power distribution unit (PDU), the method comprising:
- using the PDU to supply an alternating current (AC) power signal to at least one target device via the specific AC power outlet of the PDU;
- using the PDU to directly modulate the AC power signal in accordance with a predefined power cycle profile (PCP) event repeated a plurality of times in accordance with a predetermined repetition pattern of varying time intervals, to create a modulated AC power signal, and wherein the PCP events represent an encoded message which is embedded in the modulated AC power signal, and which form a sequence of detectible, temporary reductions in magnitude of the AC power signal, but where the temporary reductions in magnitude do not cause a reduction in AC power sufficient to result in re-booting of the at least one target device being powered by the AC power signal;
- using the target device to receive the encoded message via the AC power signal and to decode the encoded message to produce a decoded message; and
- using the decoded message to determine if the target device is receiving the AC power signal from the specific AC power outlet of the PDU.

24. The system of claim 1, wherein the message encoding algorithm module includes a relay which is controlled in ON and OFF operation to create the encoded message in the AC power signal.

* * * * *